United States Patent
Cho et al.

(10) Patent No.: US 8,825,393 B2
(45) Date of Patent: Sep. 2, 2014

(54) METHOD FOR PROVIDING LOCATION SERVICE AND MOBILE TERMINAL

(75) Inventors: Young Su Cho, Seoul (KR); Sung Jo Yun, Daejeon-si (KR); Myung In Ji, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 218 days.

(21) Appl. No.: 13/324,716

(22) Filed: Dec. 13, 2011

(65) Prior Publication Data

US 2012/0150434 A1 Jun. 14, 2012

(30) Foreign Application Priority Data

Dec. 13, 2010 (KR) ........................ 10-2010-0127229

(51) Int. Cl.
*G01C 21/36* (2006.01)
(52) U.S. Cl.
CPC ................................... *G01C 21/367* (2013.01)
USPC ............................ 701/457; 701/400; 701/455
(58) Field of Classification Search
None
See application file for complete search history.

(56) References Cited

U.S. PATENT DOCUMENTS

| | | | | | |
|---|---|---|---|---|---|
| 5,450,343 | A | * | 9/1995 | Yurimoto et al. | 701/410 |
| 5,732,385 | A | * | 3/1998 | Nakayama et al. | 701/437 |
| 5,752,219 | A | * | 5/1998 | Yoshihara et al. | 701/487 |
| 5,774,829 | A | * | 6/1998 | Cisneros et al. | 701/475 |
| 5,938,719 | A | * | 8/1999 | Arakawa et al. | 701/532 |
| 6,334,090 | B1 | * | 12/2001 | Fujii | 701/468 |
| 6,377,210 | B1 | * | 4/2002 | Moore | 342/357.4 |
| 6,567,744 | B1 | * | 5/2003 | Katayama et al. | 701/410 |
| 6,714,863 | B2 | * | 3/2004 | Katayama et al. | 701/428 |
| 6,714,864 | B2 | * | 3/2004 | Odamura | 701/455 |
| 6,847,325 | B2 | * | 1/2005 | Kim | 342/357.29 |
| 7,170,518 | B1 | * | 1/2007 | Millington et al. | 345/428 |
| 7,471,952 | B2 | * | 12/2008 | Hirokawa | 455/452.2 |
| 7,835,863 | B2 | * | 11/2010 | Lokshin et al. | 701/472 |
| 7,839,306 | B2 | * | 11/2010 | Tanizaki et al. | 340/995.1 |
| 8,082,096 | B2 | * | 12/2011 | Dupray | 701/465 |
| 8,165,606 | B2 | * | 4/2012 | Dunn et al. | 455/456.6 |
| 8,184,563 | B2 | * | 5/2012 | Riley et al. | 370/310.2 |
| 8,260,550 | B2 | * | 9/2012 | Highstrom et al. | 701/454 |
| 8,290,702 | B2 | * | 10/2012 | Yeh | 701/433 |
| 8,396,661 | B2 | * | 3/2013 | Wong et al. | 701/472 |
| 8,462,745 | B2 | * | 6/2013 | Alizadeh-Shabdiz | 370/338 |
| RE44,378 | E | * | 7/2013 | Borkowski et al. | 455/404.2 |
| 8,515,658 | B1 | * | 8/2013 | Foster et al. | 340/945 |
| 2006/0247855 | A1 | * | 11/2006 | de Silva et al. | 701/212 |
| 2009/0046111 | A1 | * | 2/2009 | Joachim et al. | 345/660 |

(Continued)

OTHER PUBLICATIONS di Flora, Cristiano, "Indoor and Outdoor Location Based Services for Portable Wireless Devices," 25th IEEE International Conference, (2005).*

*Primary Examiner* — Thomas Tarcza
*Assistant Examiner* — Richard Goldman
(74) *Attorney, Agent, or Firm* — Nelson Mullins Riley & Scarborough LLP

(57) ABSTRACT

A method for providing a location service and a mobile terminal are provided. The location service providing method includes determining a positioning method based on location information of the mobile terminal and measurement information used for calculating the location of the mobile terminal, determining a map switch indicator by using at least one of the determined positioning method, the location information, and the measurement information, selecting a global map (i.e., the whole area map) or a local map according to the determined map switch indicator, and indicating the location of the mobile terminal on the selected map.

15 Claims, 10 Drawing Sheets

(56) References Cited

U.S. PATENT DOCUMENTS

2009/0096753 A1* 4/2009 Lim .............................. 345/173
2009/0177374 A1* 7/2009 Liu ............................... 701/200
2011/0018732 A1* 1/2011 Cho et al. ................. 340/825.49
2011/0205108 A1* 8/2011 Boyer et al. ............. 342/357.25
2012/0150434 A1* 6/2012 Cho et al. ...................... 701/445

* cited by examiner

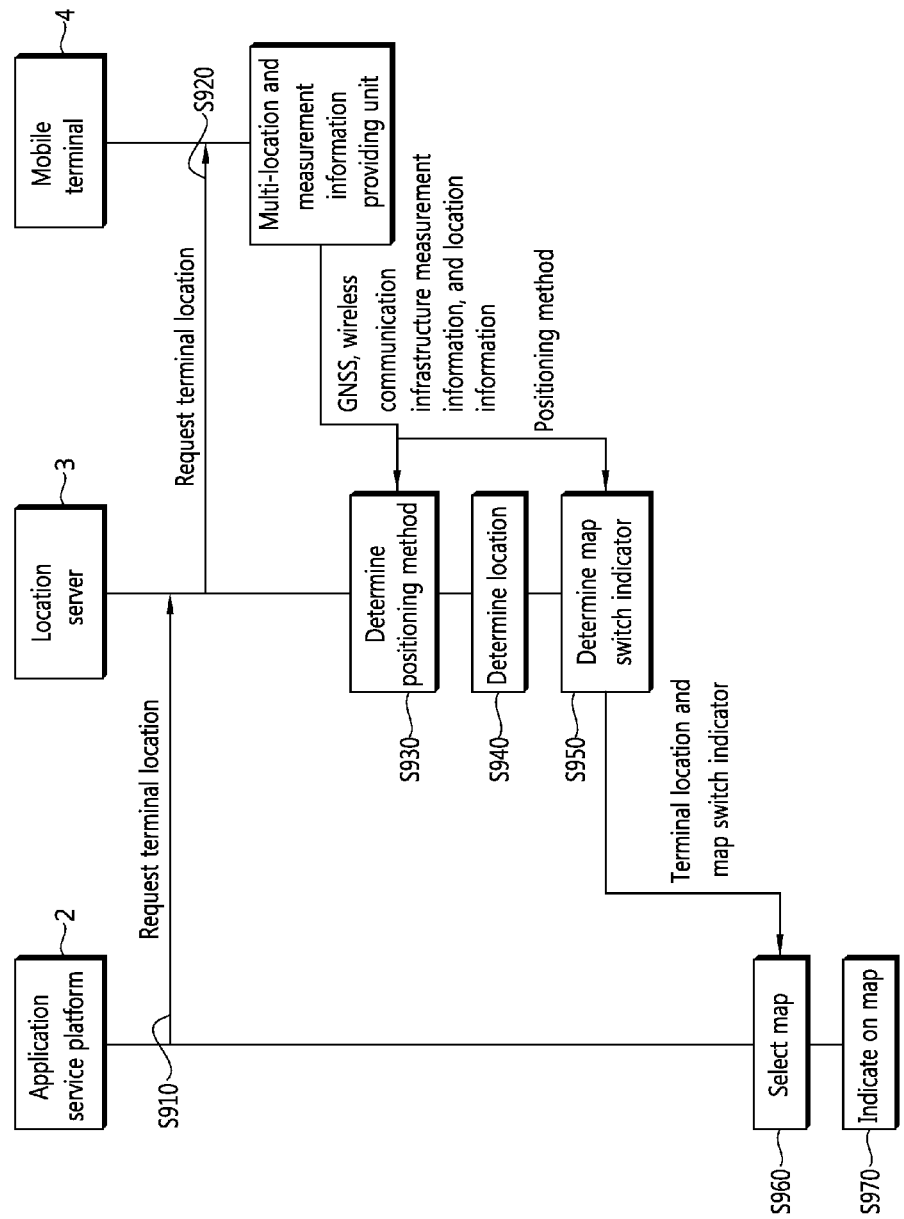

METHOD FOR PROVIDING LOCATION SERVICE AND MOBILE TERMINAL

This application claims the benefit of priority of Korean Patent Application No. 10-2010-0127229 filed on Dec. 13, 2011, which are incorporated by reference in their entirety herein.

BACKGROUND OF THE INVENTION

1. Field of the Invention

The present invention relates to a method for providing a location service and a mobile terminal and, more particularly, to a method for determining an optimum positioning method, selecting an appropriate map, and indicating the location of a mobile terminal on the map to provide a location service, and a mobile terminal.

2. Related Art

A mobile terminal, such as a cellular phone, a PDA, a smartphone, or the like, is able to determine its location according to various positioning methods. Currently, a positioning method of a terminal providing the widest service area and high accuracy is a global navigation satellite system (GNSS).

For example, a particular terminal may determine its location by using satellite signals received from at least four or more GNSS satellites by using a GNSS receiver in an outer area in which satellite signals of GNSS satellites can be received. The positioning by using GNSS offers high accuracy and availability within 10 m in a flatland or in the suburb in which a direct line of sight is secured between the GNSS satellites and the terminal, but in a downtown congestion area, a non-line of sight area, there is a location error up to 50 m due to a multi-path error, and in particular, in an indoor area, a reception signal sensitivity is degraded, making it impossible to determine the location of the terminal.

The difficulties in providing the location information in the indoor area and in downtown congestion area can be resolved by a positioning method based on a wireless communication infrastructure. For example, a particular terminal may determine its location in an indoor environment in which multiple WLAN APs (Wireless Local Area Network Access Points) are installed, based on measurement information such as a received signal strength indicator (RSSI) received by a WLAN reception unit, a round trip time (RTT), or the like .... In another example, a certain terminal may determine its location through a positioning method such as an enhanced cell/sector, advanced forward link trilateration (AFLT), enhanced observed time difference (EOTD), observed time difference of arrival (OTDOA), or the like, by using identification information of a mobile communication base station and a time difference of arrival (TDOA) measurement value.

In an indoor/outdoor transition section, the accuracy of a terminal's location can be improved through a composite positioning method based on multiple sensors whose error characteristics are complementary.

For example, when a terminal including a GNSS and a WLAN receiver moves to an indoor area from an outdoor area, GNSS location accuracy is degraded due to a reduction in the number of visible satellites and an increase in a multi-path error resulting from the entry of a building, while a WLAN-based location accuracy can be improved owing to an increase in the number of reception-available WLAN APs and an increase in the received signal strength. Meanwhile, when the terminal moves from an indoor area to an outdoor area, the GNSS location accuracy and the WLAN location accuracy have the opposite characteristics. Thus, the accuracy of a final location of the terminal can be improved by combining location sensors having the complementary location error and distribution characteristics.

Despite the presence of various terminal positions methods, it is not easy to provide continuous and accurate location information of a terminal in both indoor and outdoor areas through a single positioning method.

In the related art, the location of a terminal is determined by selecting a single positioning method having a minimum location error range among available positioning resources after determining whether or not positioning resources from a wireless communication infrastructure such as a mobile communication base station, WLAN, Bluetooth™, UWB (Ultra-wideband), RFID (Radio-Frequency Identification), or the like, or from the GNSS have been received.

SUMMARY OF THE INVENTION

It is, therefore, an object of the present invention to provide a method for providing a location service by selecting a positioning method which provides optimum location accuracy in an environment in which various positioning resources are provided, and a mobile terminal.

To achieve the above object, there is provided a location service providing method for providing the location of a mobile terminal, including: determining a positioning method based on location information of the mobile terminal and measurement information used for calculating the location of the mobile terminal; determining a map switch indicator by using at least one of the determined positioning method, the location information, and the measurement information; selecting a global map (i.e., the whole area map) or a local map according to the determined map switch indicator; and indicating the location of the mobile terminal on the selected map.

To achieve the above object, there is also provided a mobile terminal including: a positioning method determining unit configured to determine a positioning method based on location information and measurement information used for calculating a location; a map switch indicator determining unit configured to determine a map switch indicator by using at least one of the determined positioning method, the location information, and the measurement information; a map selection unit configured to select a global map or a local map according to the determined map switch indicator; and a location indication unit configured to indicate the location of the mobile terminal on the selected map, wherein the location information includes location information of the mobile terminal provided currently or provided in the past from a global navigation satellite system (GNSS), the measurement information includes at least one of the number of transmitters of a wireless communication infrastructure capable of wirelessly communicating with the mobile terminal, the number of visible satellites of the GNSS, a carrier-to-noise ratio (CNo) of the respective GNSS visible satellites, and a dilution of precision (DoP) of the location information, and the positioning method is any one of positioning by the GNSS, positioning based on the wireless communication infrastructure, and composite positioning for positioning by using all the location information of the mobile terminal provided from both the GNSS and the wireless communication infrastructure.

To achieve the above object, there is also provided a method for providing a location service by a server, including: determining a positioning method based on location information of the mobile terminal and measurement information used for calculating the location of the mobile terminal; determining a map switch indicator by using at least one of the determined positioning method, the location information, and the measurement information; and transmitting the location information and the determined map switch indicator, wherein the location information includes location information of the mobile terminal provided currently or provided in the past from a global navigation satellite system (GNSS), the measurement information includes at least one of the number of transmitters of a wireless communication infrastructure capable of wirelessly communicating with the mobile terminal, the number of visible satellites of the GNSS, a carrier-to-noise ratio (CNo) of the respective GNSS visible satellites, and a dilution of precision (DoP) of the location information, and the positioning method is any one of positioning by the GNSS, positioning based on the wireless communication infrastructure, and composite positioning for positioning by using all the location information of the mobile terminal provided from both the GNSS and the wireless communication infrastructure.

According to exemplary embodiments of the present invention, a positioning method optimized for a measurement environment can be selected to thus improve the location accuracy of a terminal. In addition, since the selection reference of a local map and a global map and the map switch indicator generation method are presented, ambiguity of a map selection can be eliminated and a location indication on a map can be precisely performed in a location-based application service based on the selection reference of a local map and a global map and the map switch indicator generation method.

BRIEF DESCRIPTION OF THE DRAWINGS

The above and other objects and features of the present invention will become apparent from the following description of preferred embodiments given in conjunction with the accompanying drawings, in which:

FIG. 9 is a flowchart illustrating the process of a method for providing a location service by a server according to another exemplary embodiment of the present invention.

DETAILED DESCRIPTION OF THE EMBODIMENTS

The foregoing and other objects, features, aspects and advantages of the present invention will become more apparent from the following detailed description of the present invention when taken in conjunction with the accompanying drawings. Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is defined by the description of claims. The terms used in the present application are merely used to describe particular embodiments, and are not intended to limit the present invention. As used herein, the singular forms are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

In exemplary embodiments of the present invention, a mobile terminal can select an optimum positioning method from among selectable positioning methods by using measurement information and/or location information provided from a global navigation satellite system (GNSS) and from a wireless communication infrastructure, thus providing an accurate location service. In exemplary embodiments of the present invention, a map switch indicator is generated by using measurement information of the GNSS or the wireless communication infrastructure, thus accurately and easily selecting a map on which the location of the mobile terminal is to be indicated. In addition, a map appropriate for an environment in which the mobile terminal is located is intelligently selected and displayed, thus providing a realistic indoor/outdoor continuous positioning service or the like. Exemplary embodiments of the present invention will be described in detail with reference to the accompanying drawings.

Figure 1A:
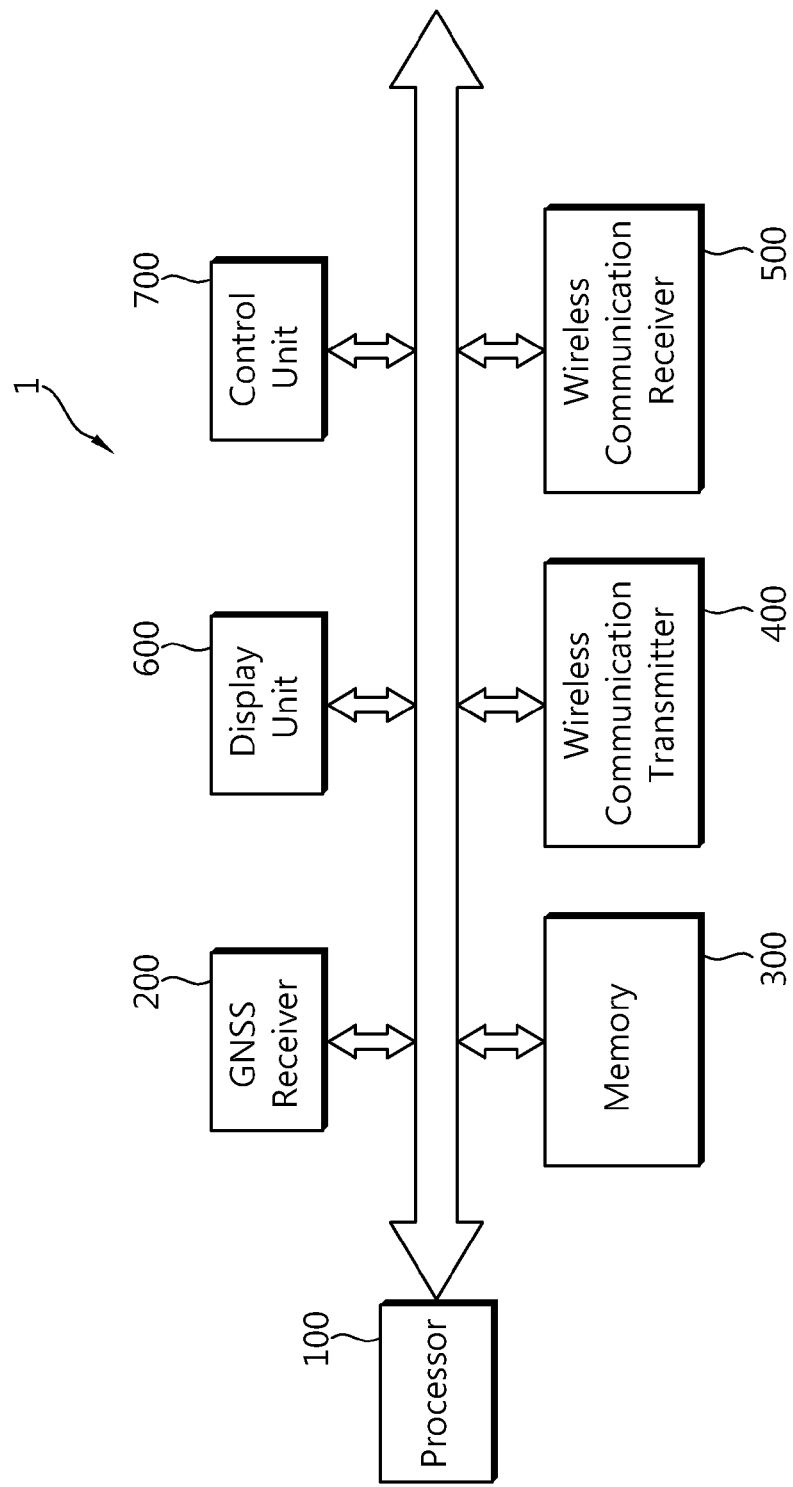
FIG. 1A is a schematic block diagram of a mobile terminal according to an exemplary embodiment of the present invention.
Figure 1B:
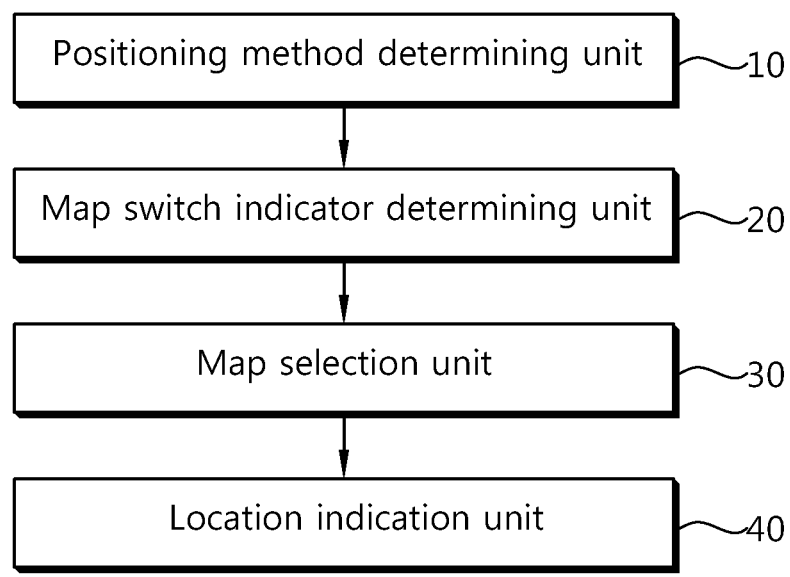
FIG. 1B is an exemplary block diagram of a processor of FIG. 1A.
Figure 2:
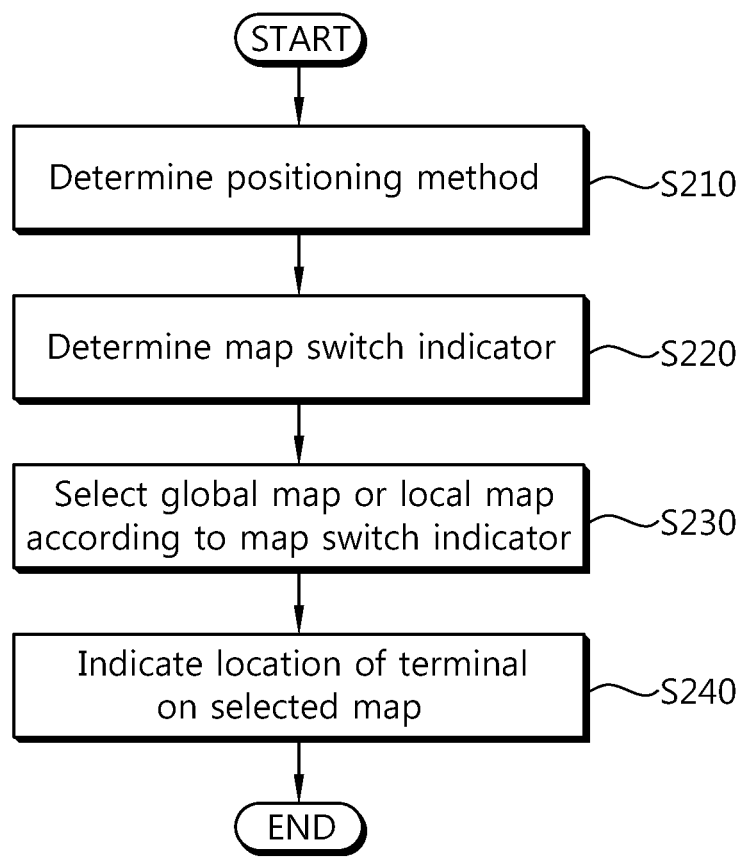
FIG. 2 is a flowchart illustrating the process of a method for providing a location service according to an exemplary embodiment of the present invention.
Figure 3:
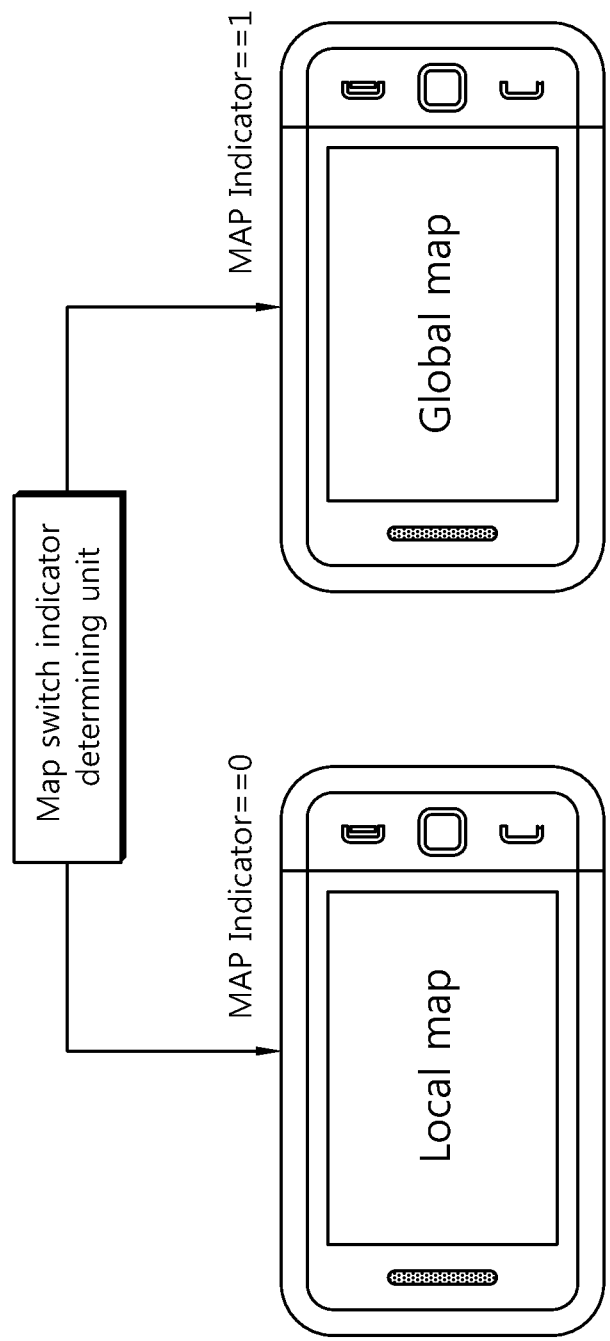
FIG. 3 is a conceptual view for explaining a detailed operation of a map selection unit and a location indication unit of FIG. 1B.
Figure 4:
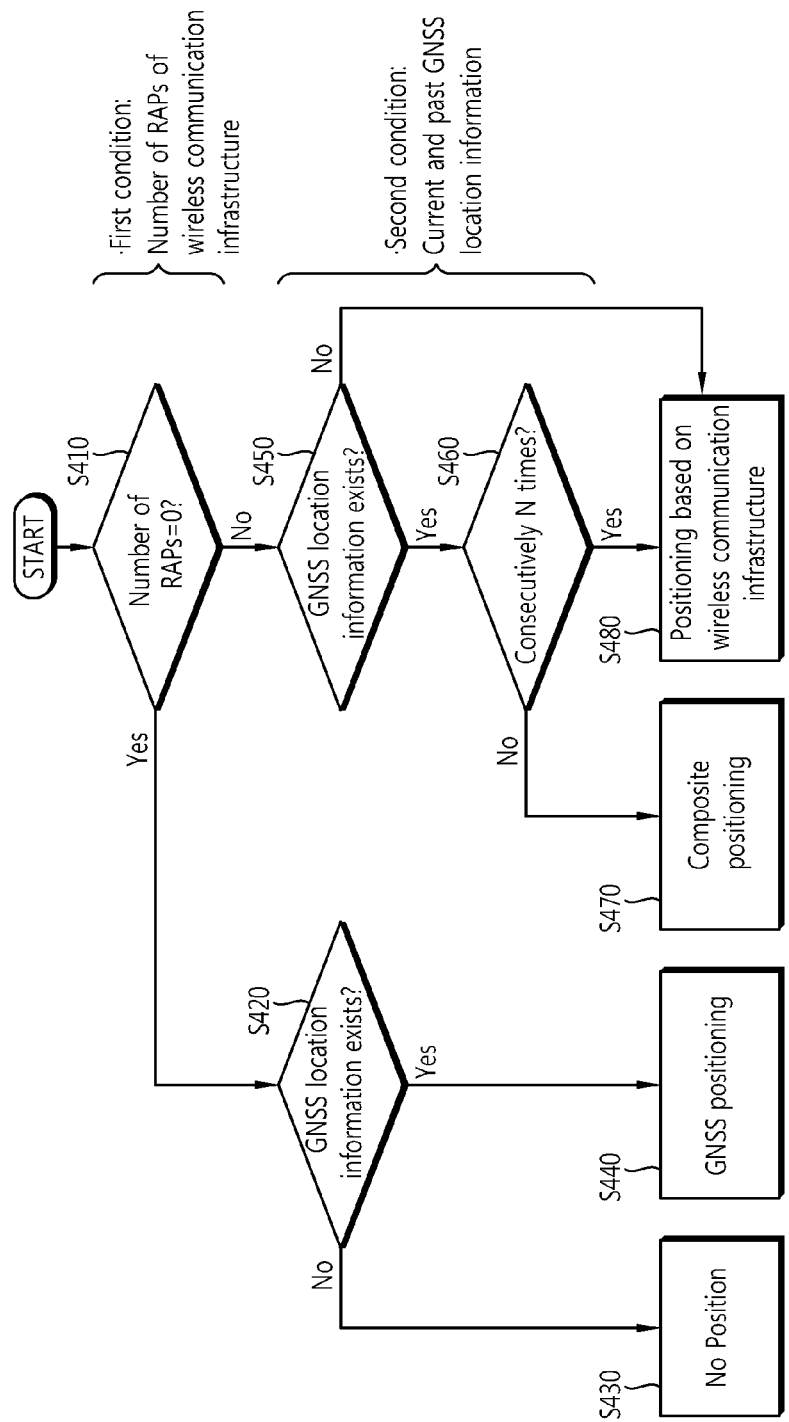
FIGS. 4 and 5 are flowcharts illustrating the operation of a positioning method determining unit of FIG. 1B.
Figure 5:
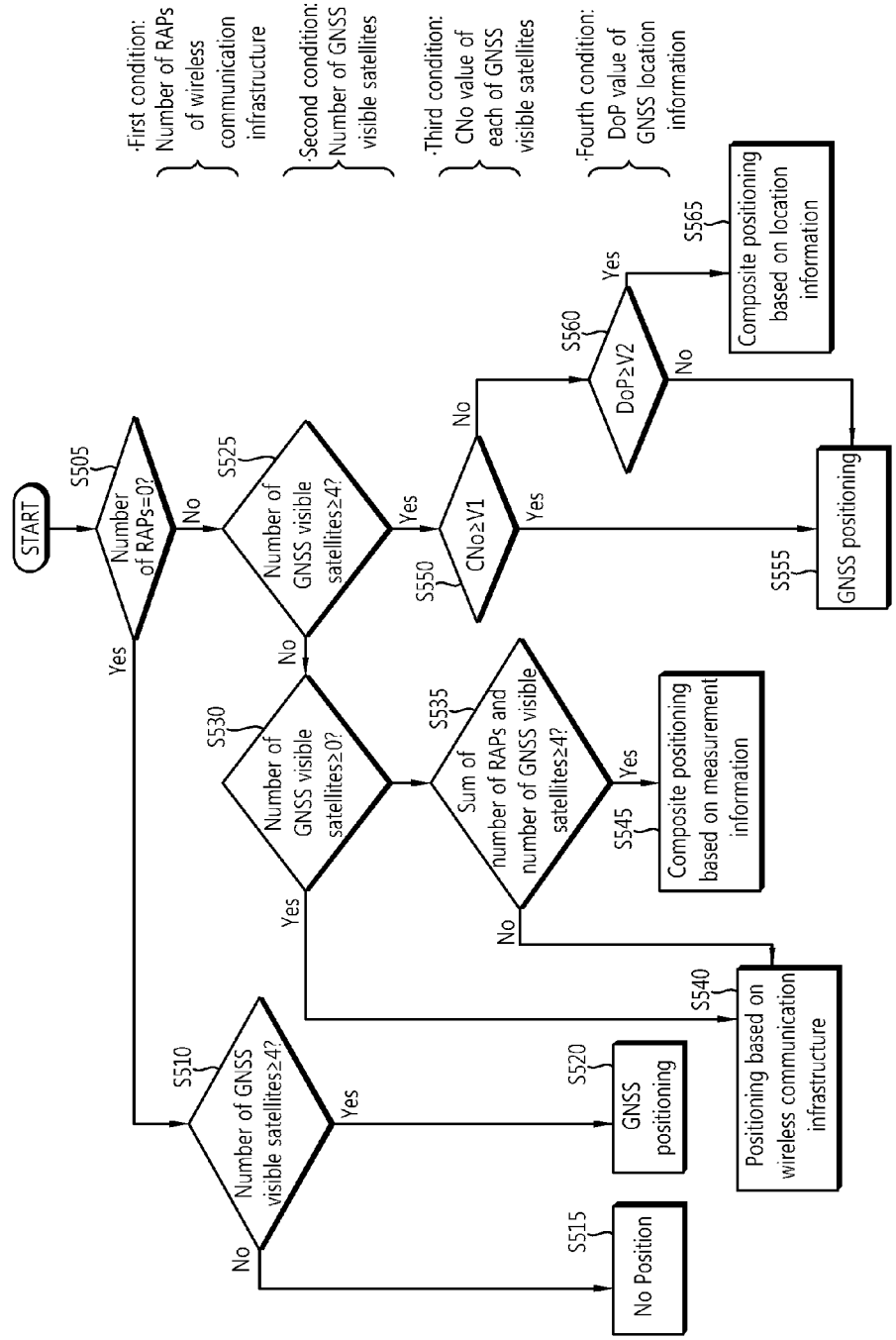
Figure 6:
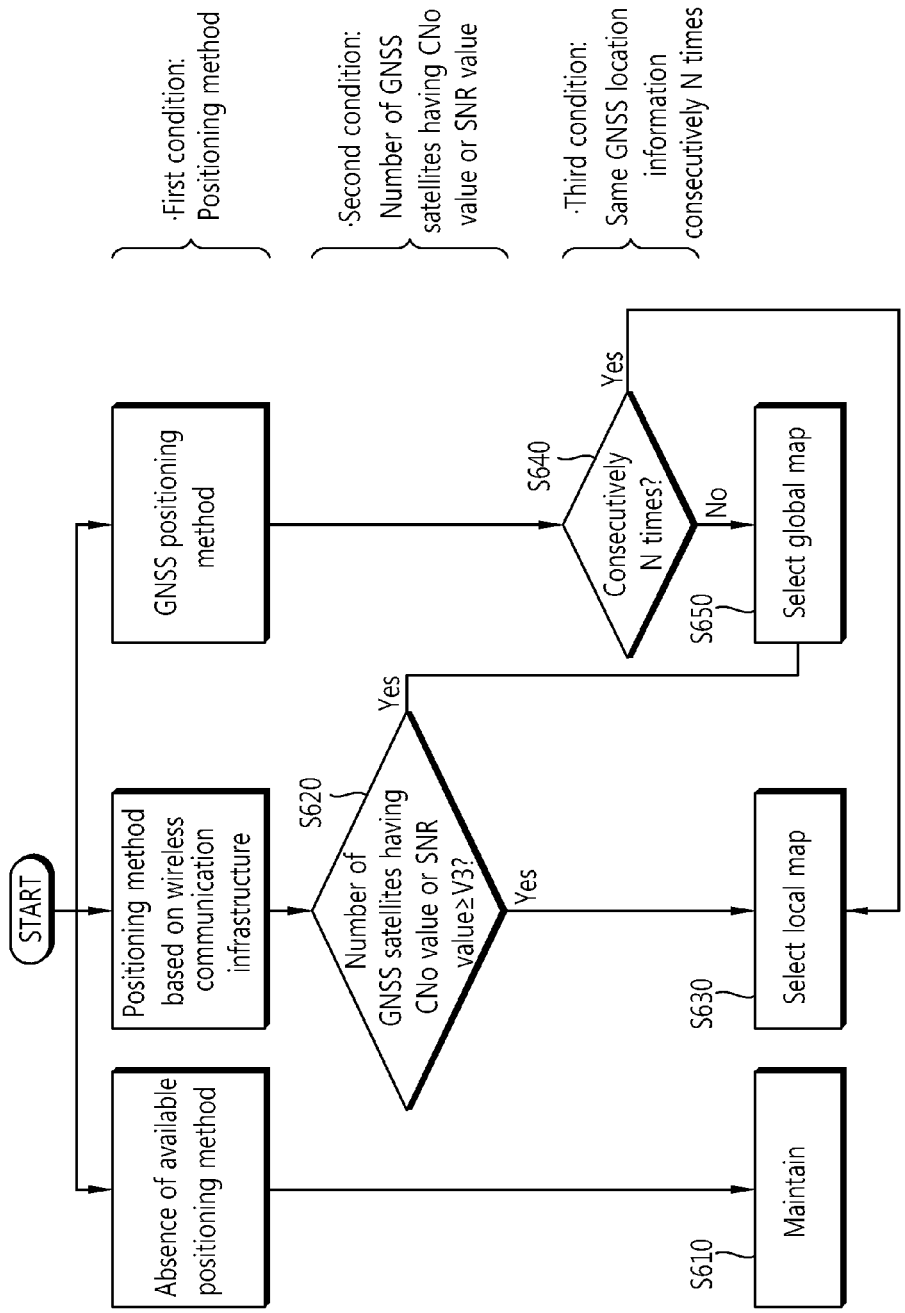
FIGS. 6 and 7 are flowcharts illustrating the operation of a map switch indicator determining unit of FIG. 1B.
Figure 7:
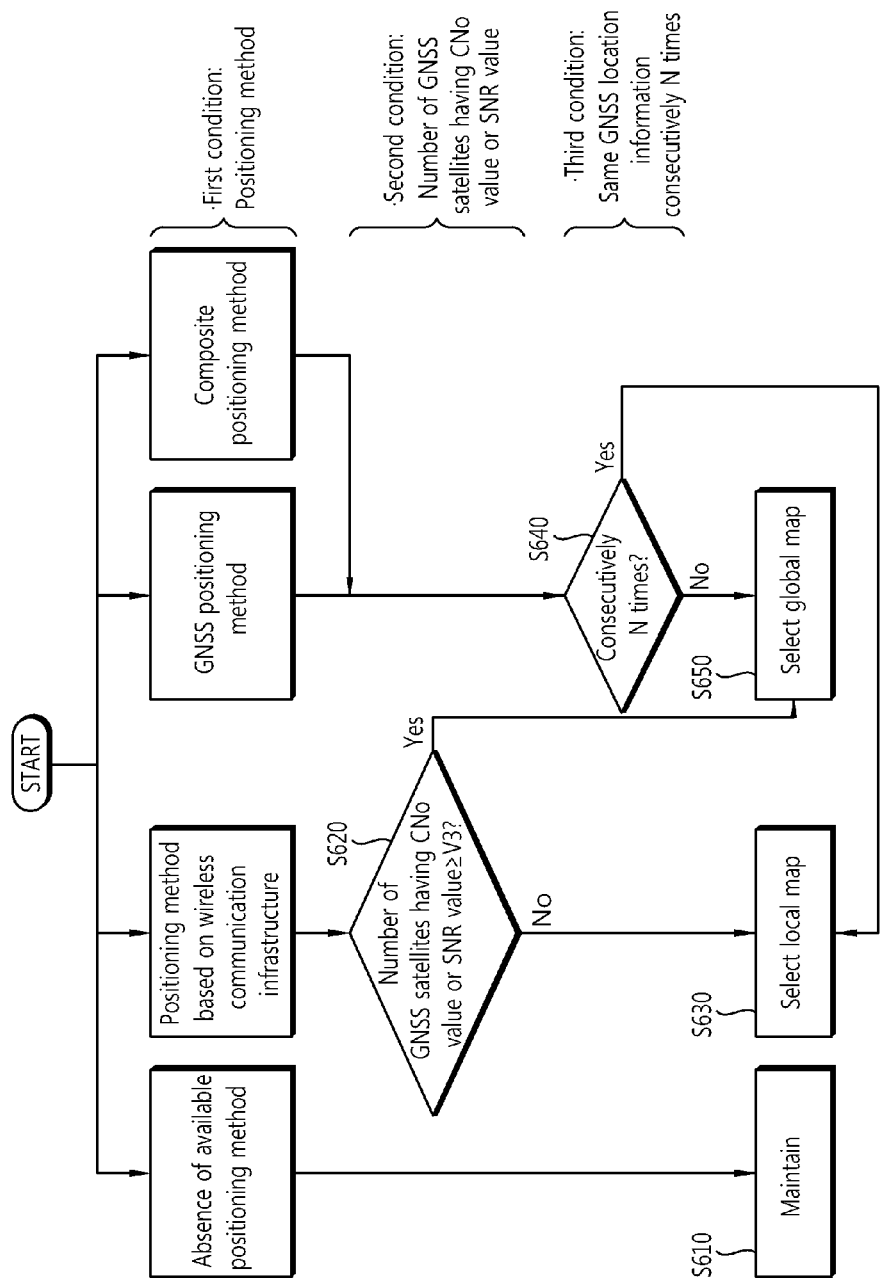

A method for providing a location service and a mobile terminal according to exemplary embodiments of the present invention will now be described with reference to FIGS. 1A to 7. FIG. 1A is a schematic block diagram of a mobile terminal according to an exemplary embodiment of the present invention. FIG. 1B is an exemplary block diagram of a processor of FIG. 1A. FIG. 2 is a flowchart illustrating the process of a method for providing a location service according to an exemplary embodiment of the present invention. FIG. 3 is a conceptual view for explaining a detailed operation of a map selection unit and a location indication unit of FIG. 1B. FIGS. 4 and 5 are flowcharts illustrating the operation of a positioning method determining unit of FIG. 1B. FIGS. 6 and 7 are flowcharts illustrating the operation of a map switch indicator determining unit of FIG. 1B.

With reference to FIG. 1A, a mobile terminal 1 may include a processor 100, a GNSS receiver 200, a memory 300, a wireless communication transmitter 400, a wireless communication receiver 500, a display unit 600, and a control unit 700.

The processor 100 determines a positioning method, determines a map switch indicator, selects a map, and indicates the location of the mobile terminal on the selected map, by exchanging information with other elements in the mobile terminal 1. The internal configuration of the processor 100 will be described in detail with reference to FIG. 2.

The GNSS receiver 200 receives signals transmitted from a plurality of satellites deployed in space, from a GNSS, a satellite navigation system for calculating the locations of objects on the earth. The GNSS includes GPS, Galileo, Glonass, Compass, or the like, throughout the world. The GNSS can measure a time of arrival (ToA) between each of the satellites and the GNSS receiver by using a signal including a pseudo-random noise code differentiated for each of the satellites, and determine the location of the GNSS receiver 200, namely, the location of the mobile terminal 1, by employing trigonometry. Thus, the GNSS receiver 200 can calculate measurement information, or the like, required for calculating the location of the mobile terminal and provide the calculated measurement information to the processor 100. Here, the measurement information may include, for example, the number of GNSS visible satellites, a dilution of precision (DoP) of the location information provided from the GNSS, a pseudo-distance of each satellite of the GNSS, carrier information, a signal-to-noise ratio (SNR), a carrier-to-noise ratio (CNo), and the like.

The memory 300 stores the foregoing location information and measurement information and the stored information is utilized when the processor 100 determines a positioning method and a map switch indicator.

The wireless communication transmitter 400 transmits information through radio communication such as circuit or packet-based communication, and the like. The wireless communication receiver 500 receives information through radio communication. A MAC address, a received signal strength (RSSI), or the like, of a transmission side, among information received via the wireless communication receiver 500, may be used to determine a positioning method.

The display unit 600 displays a map and the location of the mobile terminal, and the control unit 700 may control the respective elements and the operations between the elements.

As shown in FIG. 1B, the process 100 in FIG. 1A may include a positioning method determining unit 10, a map switch indicator determining unit 20, a map selection unit 30, a location indication unit 40.

The operations of the respective elements of FIGS. 1A and 1B will be described in detail with further reference to FIG. 2. First, the positioning method determining unit 10 receives one or a plurality of items of location information and measurement information from the GNSS and a wireless communication infrastructure and determines one positioning method, among various positioning methods, based on the received information in operation S210.

The map switch indicator determining unit 20 determines a map switch indicator based on at least one of the positioning method determined by the positioning method determining unit 10, the location information, and the measurement information in operation S220.

The map selection unit 30 selects a global map or a local map according to the map switch indicator in operation S230.

The location indication unit 40 indicates the location of the terminal on the selected map on the display unit 600.

FIG. 3 is a conceptual view for explaining a detailed operation of the map selection unit 30 and the location indication unit 40 of FIG. 1B.

The map selection unit 30 uses a may switch indicator to selects a local map (map switch indicator=0) or a global map (map switch indicator=1). The map switch indicator is an internal value used to indicate which map between a local map and a global map is selected to indicate the location of a mobile terminal. The value of the man switch indicator is determined by the map switch indicator determining unit 20. Here, the local map refers to a map expressing detailed spatial information of an area limited based on a local coordinate system such as a civic address, a relative location, and the like, which may include, for example, an indoor plane map, a guide map, a configuration map, and the like. The global map refers to a map expressing global spatial information based on a global coordinate system such as WGS84, or the like, which may include, for example, the Google map, or the like.

The location indication unit 40 may indicate the location of the terminal on the map selected according to the map switch indicator. The indicated position may be indicated by an icon, or the like, on the map, or the location calculated in the form of text on the map. It may sequentially or collectively indicate one or a plurality of past positions, as well as current locations.

Hereinafter, the process of determining a positioning method by the positioning method determining unit 10 of FIG. 1B will be described in detail with further reference to FIG. 4.

According to the present exemplary embodiment, the positioning method determining unit 10 determines a positioning method according to the number of registered Access Points (RAPs) (a first condition) and the past and current location information of the mobile terminal received from the GNSS (referred to as 'GNSS location information', hereinafter) (a second condition). Here, the RAP refers to a wireless communication infrastructure transmitter, e.g., a mobile communication base station, a WLAN AP, or the like, whose location is known by measuring or predicting its installation location, and the corresponding location may be stored in the form of a database in a location server, or the like.

In more detail, the positioning method determining unit 10 determines whether or not the number of RAPs of the wireless communication infrastructure is 0 in operation S410. Upon determination, when the number of the RAPs of the wireless communication infrastructure is 0, namely, when there is no wireless communication infrastructure RAP, the positioning method determining unit 10 determines whether or not there is received GNSS location information in operation S420. When GNSS location information does not exist, the positioning method determining unit 10 selects 'No position' indicating that the location of the mobile terminal 1 cannot be determined or that there is no available positioning method in operation S430.

If the wireless communication infrastructure RAP does not exist and the GNSS location information exists, the positioning method determining unit 10 selects positioning by the GNSS as a positioning method in operation 440. Here, the positioning by the GNSS may be a method for determining the location of the mobile terminal by using satellite signals received from GNSS satellites.

If the wireless communication infrastructure RAP exists, the positioning method determining unit 10 determines whether or not GNSS location information exists in operation S450. If the GNSS location information does not exist, the positioning method determining unit 10 selects positioning based on the wireless communication infrastructure in operation S480. Here, the positioning based on the wireless communication infrastructure may determine the location of the mobile terminal in an indoor environment in which multiple WLAN APs are installed based on the measurement information such as a received signal strength indicator (RSSI) received by the wireless communication receiver 400, a round trip time (RTT), and the like, or may determine the location of the mobile terminal through a positioning scheme such as an enhanced cell/sector, advanced forward link trilateration (AFLT), enhanced observed time difference (EOTD), observed time difference of arrival (OTDOA), or the like, by using identification information of a mobile communication base station and a time difference of arrival (TDOA) measurement value.

When the wireless communication infrastructure RAP exists and the GNSS location information also exists, the positioning method determining unit 10 determines whether or not the GNSS location information is consistent consecutively N times, where N is an integer larger than zero, from the past to present in operation S460.

When the GNSS location information is consistent consecutively N times from the past to present, the positioning method determining unit 10 selects a positioning method based on the wireless communication infrastructure in operation S480. The GNSS location information which is consistent consecutively N times appears when the GNSS receiver 200 is not able to receive satellite signals from the GNSS satellites or when the GNSS receiver 200 moves to an indoor or shadow area having weak reception sensitivity to it cannot update the GNSS location information. Thus, the corresponding location information is provided as the same location information even while the mobile terminal 1 actually moves, thereby increasing errors. Even if the mobile terminal 1 is stopped in actuality, when a GNSS reception environment and signal strength are altered, the location information may be changed as if the location of the mobile terminal 1 was changed. Nevertheless, the same location information generated consecutively N times sufficiently supports the inference that the mobile terminal 1 has moved to an environment in which the GNSS location information can be hardly received. Thus, in case of the same GNSS location information generated consecutively N times, the positioning method by the GNSS is not much reliable, so the positioning method determining unit 10 selects the positioning method based on the wireless communication infrastructure.

When the same GNSS location information is not generated consecutively N times, for example, when the GNSS location information changes each time, the positioning method by the GNSS and the positioning method based on the wireless communication infrastructure are all reliable, so the positioning method determining unit 10 selects a composite positioning method by combining the location information provided from the GNSS and that from the wireless communication infrastructure in operation S470. In this case, 'N' may be experimentally determined according to the type of the GNSS receiver and a terminal reception environment.

A positioning method determining method, which is different from the foregoing method, conducted by the positioning method determining unit of FIG. 1B will now be described with reference to FIG. 5.

In the present exemplary embodiment, the positioning method determining unit 10 determines a positioning method according to the number of RAPs of the wireless communication infrastructure (a first condition), the number of GNSS visible satellites at present and in the past (a second condition), a CNo value of each of the GNSS visible satellite (a third condition), and a dilution of precision (DoP) of the GNSS location information (a fourth condition). Unlike the case illustrated in FIG. 4, the composite positioning method may be divided into a measurement information-based composite positioning method and a location information-based composite positioning method in FIG. 5.

First, the positioning method determining unit 10 determines whether or not the number of RAPs of the wireless communication infrastructure is 0 in operation S505. Upon determination, when the number of the RAPs of the wireless communication infrastructure is 0, namely, when there is no wireless communication infrastructure RAP, the positioning method determining unit 10 determines whether or not the number of GNSS visible satellites is 4 or greater in operation S510. When the GNSS visible satellite does not exist, the positioning method determining unit 10 selects 'No position' indicating that the location of the mobile terminal 1 cannot be determined or that there is no available positioning method in operation S515. When the number of GNSS visible satellites is 4 or greater, the positioning method determining unit 10 determines the positioning method by the GNSS in operation S520.

Meanwhile, when there are RAPs in the wireless communication infrastructure, the positioning method determining unit 10 determines whether or not the number of the GNSS visible satellites is 4 or greater in operation S525.

When the number of the GNSS visible satellites is not 4 or greater, the positioning method determining unit 10 determines whether or not the number of the GNSS visible satellites is 0 in operation S530. If there is no GNSS visible satellite, the positioning method determining unit 10 determines the positioning method based on the wireless communication infrastructure in operation S540. If there are GNSS visible satellites, the positioning method determining unit 10 determines whether or not the number of items of measurement information provided from the GNSS and the wireless communication infrastructure, which can be used for calculating the location, is 4 or greater in operation S535.

Location calculation is not possible with the GNSS alone, but when there are four or more items of the measurement information from the GNSS and the wireless communication infrastructure, which can be utilized for a location calculation, the positioning method determining unit 10 determines the composite positioning method based on the measurement information by which positioning is performed by combining the measurement information from the GNSS and that of the wireless communication infrastructure in operation S545. Namely, when there is an RAP of the wireless communication infrastructure, the number of the GNSS visible satellites is equal to or greater than 1 but smaller than 4, and the sum of the items of the measurement information of the GNSS and the wireless communication infrastructure is 4 or greater, the positioning method determining unit 10 may select the measurement information-based composite positioning method. In general, in order to perform positioning by the GNSS alone, at least 4 or more items of visible satellite measurement information are required. However, in an indoor area or in a downtown congestion area, the number of the GNSS visible satellites is reduced to be smaller than 4, making it impossible to determine the location. In this case, the location availability of the mobile terminal can be increased by increasing the sum of the items of the measurement information from the GNSS and the wireless communication infrastructure with the aid of measurement information of the available wireless communication infrastructure therearound.

When there are RAPs of the wireless communication infrastructure and the number of GNSS visible satellites is 4 or greater, the positioning method determining unit 10 determines whether or not the CNo values of all the GNSS visible satellite are equal to or greater than a first threshold value (V1) in operation S550. When the CNo values of all the GNSS visible satellites are equal to or greater than the first threshold value (V1), the positioning method determining unit 10 selects the positioning method by the GNSS in operation S555.

When the CNo values of the GNSS visible satellites are smaller than the first threshold value (V1), the positioning method determining unit 10 determines whether or not the DoP value of the GNSS location information is equal to or greater than a second threshold value (V2) in operation S560. When the DoP value of the GNSS location information is equal to or greater than the second threshold value (V2), the positioning method determining unit 10 selects the location information-based composition positioning method in operation S565.

The location information-based composite positioning method is selected to improve the location accuracy through composite positioning when the location information of the mobile terminal 1 can be provided from both the GNSS and the wireless communication infrastructure. Namely, when the RAPs of the wireless communication infrastructure exist, the number of the GNSS visible satellites is equal to or greater than 4, the CNo values of all the satellites used for the calculation (or computation), among the GNSS visible satellites, are not equal to or greater than the first threshold value (V1), and the DoP of the GNSS location information is not equal to or greater than the second threshold value (V2), then, the location information-based composite positioning method may be selected.

As for the location information-based composite positioning method, since the RAPs of the wireless communication infrastructure exist and the number of the GNSS visible satellites is 4 or greater, there are location information provided from both the wireless communication infrastructure and the GNSS. However, if the CNo value of a particular satellite, among CNo values of the respective satellites of the GNSS, is smaller than the first threshold value (V1), a signal from the corresponding satellite is determined to be a weak signal which has been affected by a multi-path error, rather increasing the location error. Also, when the DoP value is equal to or greater than the second threshold value (V2), a geometrical disposition of the GNSS visible satellites used for the calculation is not uniform, also increasing the location error of the mobile terminal. Thus, when there is a high possibility in which the location error increases because of relying only on the GNSS location information or relying only on the GNSS positioning method in spite of the presence of the both location information from the GNSS and the wireless communication infrastructure, namely, when the DoP value is equal to or greater than the second threshold value (V2), the location of the mobile terminal 1 is measured through the composite positioning based on the location information from the GNSS and the wireless communication infrastructure. Accordingly, the location error can be reduced.

When the possibility in which the location error of the GNSS increases is low although there are both location information from the GNSS and the wireless communication infrastructure (e.g., when the CNo values of all the satellites of the GNSS are equal to or greater than the first threshold value (V1) or when the DoP value of the GNSS is smaller than the second threshold value (V2) although the CNo values of all the satellites are smaller than the second threshold value (V2)), the positioning method by the GNSS may be selected in operation S555. In this case, the threshold values (V1 and V2) of the CNo and the DoP in the present exemplary embodiment may be determined according to the standard of the GNSS receiver or may be experimentally determined according to a reception environment of the mobile terminal.

The process of selecting the map switch indicator by the map switch indicator determining unit 20 illustrated in FIG. 1B will now be described with reference to FIG. 6.

In detail, the map switch indicator determining unit 20 according to the present exemplary embodiment determines a map switch indicator by using the foregoing positioning method (a first condition), the number of GNSS satellites each having the CNo value (or SNR value) (a second condition), and the same GNSS location information consecutive N times (a third condition).

In detail, when there is no available positioning method (e.g., 'No position' in FIGS. 4 and 5), the map switch indicator determining unit 20 maintains a previous map switch indicator in operation S610. This can prevent user's visual inconvenience which may be caused due to a change in the map when the location of the mobile terminal cannot be determined.

When a current positioning method is a positioning method based on the wireless communication infrastructure, the map switch indicator determining unit 20 determines whether or not the number of GNSS satellites each having the CNo value (or the SNR value) in the GNSS is equal to or greater than a third threshold value (V3) in operation S620. When the number of GNSS satellites each having the CNo value (or the SNR value) in the GNSS is smaller than a third threshold value (V3), the map switch indicator determining unit 20 selects a local map in operation S630.

When the number of GNSS satellites each having the CNo value (or the SNR value) in the GNSS is equal to or greater than a third threshold value (V3), the map switch indicator determining unit 20 may select a global map in operation S650.

Namely, when the mobile terminal 1 is located in an environment in which the use of the GNSS satellites is not available and the wireless communication infrastructure is available (e.g., an indoor area), the positioning method based on the wireless communication infrastructure may be selected, and such an environment is maintained, the map switch indicator determining unit 20 may select a local map appropriate to express indoor information. However, when the environment of the mobile terminal is changed, namely, when the mobile terminal moves from the indoor area to an outdoor area, the map switch indicator determining unit 20 may select the global map in order to indicate the location of the mobile terminal in a relatively macroscopic space.

Here, in order to discriminate the change in the environment in which the mobile terminal 1 is located, in particular, in order t recognize the change in space from the indoor area to the outdoor area, the map switch indicator determining unit 20 checks whether or not the number of GNSS satellites each having the CNo value (or the SNR value) is equal to or greater than a certain value. In general, when the mobile terminal moves from the indoor area to the outdoor area, the GNSS receiver 200 of the mobile terminal performs acquisition and tracking, extracts a navigation message, and determines GNSS location information based on the navigation message. In this case, CNo (or SNR) information regarding visible satellites can be provided by the GNSS receiver 200 to the map switch indicator determining unit 20 before determining the GNSS location, so the movement of the mobile terminal from the indoor area to the outdoor area can be more quickly discriminated (or recognized) based on the CNo (or SNR) information.

When a current positioning method is the positioning method by the GNSS, the map switch indicator determining unit 20 determines whether or not the GNSS location information is consistent consecutively N times from the past to present in operation S640. Upon determination, when the GNSS location information is consistent consecutively N times from the past to present so it is impossible to use the GNSS satellites, the map switch indicator determining unit 20 selects the local map in operation S630. Meanwhile, when the GNSS location information is not consistent consecutively N times from the past to present, the map switch indicator determining unit 20 selects the global map in operation S650.

Namely, when the current positioning method is the positioning method by the GNSS, the mobile terminal 1 is highly likely to be located in an outdoor area in which reception from the GNSS satellites is available or to move from an indoor area to an outdoor area. In this case, when the GNSS location information which is the same consecutively N times exists, the map switch indicator determining unit 20 selects the local map, and when the GNSS location information which is the same consecutively N times does not exist, the map switch indicator determining unit 20 selects the global map.

Namely, the presence of the GNSS location information which is the same consecutively N times may mean that the mobile terminal 1 has moved to a space in which positioning by the GNSS is not available, so it may be determined that the mobile terminal has moved from the outdoor area or from a transition section of the indoor/outdoor area to the indoor area. In this case, the map switch indicator determining unit 20 selects the local map appropriate to express the indoor space. However, when the GNSS location information which is the same consecutively N times does not exist, the map switch indicator determining unit 20 determines that the mobile terminal is located in an outdoor area in which the GNSS satellite information can be received or that the mobile terminal moves from the indoor area to an outdoor area, so the map switch indicator determining unit 20 selects the global map appropriate to express the macroscopic location information. Here, the value 'N' may be experimentally determined in consideration of trade-off between the speediness in the map conversion and the congestion of the terminal user according to the frequent map conversion.

Hereinafter, the process of selecting a map switch indicator by the map switch indicator determining unit 20 of FIG. 1B according to a method different from that of FIG. 6 will now be described with reference to FIG. 7.

According to the present exemplary embodiment, the map switch indicator determining unit 20 may determine a map switch indicator by using a positioning method (a first condition), the number of GNSS satellites each having the CNo value (or SNR value) (a second condition), and the same GNSS location information consecutive N times (a third condition). The applicable positioning method may be 'No positioning method', a positioning method based on the wireless communication infrastructure, the positioning method by the GNSS, and the composite positioning method. Compared with the case illustrated in FIG. 6, the composite positioning method is added, and a repeated description of the parts described above with reference to FIG. 6 will be omitted.

When a current positioning method is the composite positioning method, namely, when the mobile terminal is located in an indoor/outdoor transition section in which both positioning based on the positioning by the GNSS and the positioning based on the wireless communication infrastructure can be performed, space information regarding the indoor/outdoor transition section may not be sufficiently expressed on the local map, so it would be more appropriate to be expressed on the global map.

Thus, according to the present exemplary embodiment, when the positioning method determining unit 10 selects the composite positioning method as the current positioning method, the map switch indicator determining unit 20 may select it in the same manner as the case in which the positioning method by the GNSS is selected.

Figure 8:
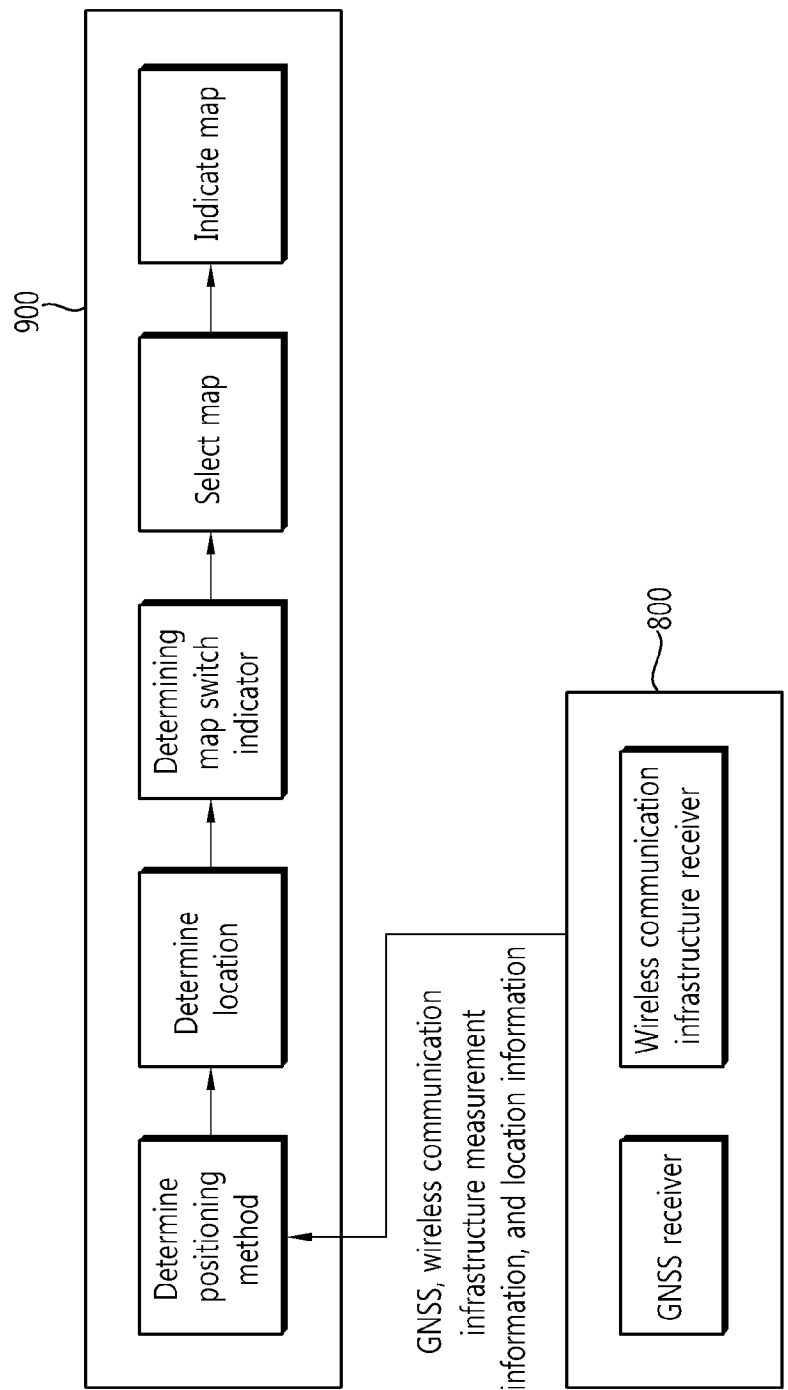
FIG. 8 is a conceptual view illustrating the process of a positioning method determining method and a map switch indicator determining method performed in a mobile terminal, as an application.

A mobile terminal according to a different exemplary embodiment of the present invention will now be described with reference to FIG. 8. FIG. 8 is a conceptual view illustrating the process of the positioning method determining method and the map switch indicator determining method performed in a mobile terminal, as an application.

The mobile terminal executing an application includes a multi-location information and measurement information generation unit 800 and a location application service providing unit 900.

The location application service providing unit 900 receives information delivered from the multi-location information and measurement information generation unit 800, e.g., the location information and measurement information from the GNSS and the wireless communication infrastructure, and provides a location-based service.

In detail, the location application service providing unit 900 receives the GNSS and wireless communication infrastructure measurement information and location information from the GNSS receiver and the wireless communication infrastructure receiver of the mobile terminal. Subsequently, the location application service providing unit 900 determines an optimum positioning method based on the GNSS and wireless communication infrastructure measurement information and location information, and when the location of the mobile terminal needs to be determined, the location application service providing unit 900 determines the location of the mobile terminal according to the positioning method which has been determined based on the GNSS and wireless communication infrastructure measurement information and location information. And then, the location application service providing unit 900 determines a map switch indicator based on the determined positioning method and the GNSS location information and measurement information, selects a map based on the map switch indicator, and indicates the location of the mobile terminal on the selected map.

A method for providing a location service by a server according to a different exemplary embodiment of the present invention will now be described with reference to FIG. 9. FIG. 9 is a flowchart illustrating the process of a method for providing a location service by a server according to another exemplary embodiment of the present invention.

An application service platform 2 may refer to a service platform or a third terminal that requests location information of the mobile terminal 4. When the application service platform 2 requests the location of the mobile terminal 4 from a location server 3 in operation S910, the location server 3 performs authentication and requests the location from the corresponding mobile terminal in operation S920.

Upon receiving the request of the location, the mobile terminal 4 receives location information and measurement information from the GNSS and the wireless communication infrastructure through the multi-location information and measurement information providing unit (800 in FIG. 8) and delivers the received information to the location server 3.

The location server 3 determines an optimum positioning method based on the received information in operation S930. When the location of the mobile terminal 4 needs to be determined, the location of the mobile terminal is determined according to the positioning method which has been determined based on the measurement information of the GNSS and the wireless communication infrastructure in operation S940. And then, the location server 3 determines a map switch indicator based on the selected positioning method, the GNSS location information, and the measurement information in operation S950. Subsequently, the location server 3 delivers finally calculated location information of the mobile terminal 4 and the map switch indicator to the application service platform 2.

Finally, the application service platform 2 selects a map based on the map switch indicator in operation S960) and indicates the location of the terminal on the selected map in operation S970.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A location service providing method for providing a location of a mobile terminal, wherein the method is performed by one or more servers the method comprising:
   determining a positioning method based on location information of the mobile terminal and measurement information used for calculating the location of the mobile terminal;
   determining a map switch indicator by using at least one of the determined positioning method, the location information, and the measurement information;
   selecting a global map or a local map according to the determined map switch indicator; and
   indicating the location of the mobile terminal on the selected map,
   wherein the location information coin rises location information of the mobile terminal provided currently and provided in the past navigation satellite system (GNSS), and the measurement information comprises the number of transmitters of the wireless communication infrastructure capable of wirelessly communicating with the mobile terminal, the number of visible satellites of the GNSS, a carrier-to-noise ratio (CNo) or a signal-to-noise ratio (SNR) of the respective GNSS visible satellites, and a dilution of precision (DoP) of the location information,
   wherein, in determining the positioning method, when there are transmitters in the wireless communication infrastructure, there are visible satellites, and the sum of the number of the transmitters of the wireless communication infrastructure and the number of the visible satellites is equal to or greater than a reference number, positioning by compositing measurement information provided from the GNSS and measurement information provided from the wireless communication infrastructure is determined as the positioning method,
   wherein, in determining the positioning method, when there are transmitters in the wireless communication infrastructure, there are visible satellites, and the sum of the number of the transmitters of the wireless communication infrastructure and the number of the visible satellites is smaller than the reference number, positioning based on the wireless communication infrastructure is determined as the positioning method,
   wherein the ma switch indicator is an internal value used to select the global map or the local map to indicate the location of the mobile terminal.

2. The method of claim 1, wherein the determining of a positioning method comprises determining positioning by the GNSS as the positioning method, when a transmitter does not exist in the wireless communication infrastructure and the location information is received from the GNSS.

3. The method of claim 1, wherein the determining of a positioning method comprises determining positioning based on the wireless communication infrastructure as the positioning method, when a transmitter exists in the wireless communication infrastructure and location information is not received from the GNSS.

4. The method of claim 1, wherein the determining of a positioning method comprises determining positioning based on the wireless communication infrastructure as the positioning method, when the location information is consistent consecutively a predetermined number of times from past to present.

5. The method of claim 1, wherein the determining of a positioning method comprises determining composite positioning for positioning by compositing the location information provided from the GLASS and the location information provided from the wireless communication infrastructure, as the positioning method, when the location information is not consistent consecutively a predetermined number of times from past to present.

6. The method of claim 1, wherein, in determining the positioning method, when there are transmitters in the wireless communication infrastructure, the number of the visible satellites is equal to or greater than a reference number, and the CNo is equal to or greater than a threshold value, positioning by the GNSS is determined as the positioning method.

7. The method of claim 1, wherein, in determining the positioning method, when there are transmitters in the wireless communication infrastructure, the number of the visible satellites is equal to or greater than a reference number, the CNo is smaller than a first threshold value, and the DoP is equal to or greater than a second threshold value, positioning by compositing the location information of the mobile terminal provided from the GNSS and the location information of the mobile terminal provided from the wireless communication infrastructure, is determined as the positioning method.

8. The method of claim 1, wherein, in determining the positioning method, when there are transmitters in the wireless communication infrastructure, the number of the visible satellites is equal to or greater than a reference number, the CNo is smaller than a first threshold value, and the DoP is smaller than a second threshold value, positioning by the GNSS is determined as the positioning method.

9. The method of claim 1, wherein the determining of the map switch indicator comprises determining the indicator for selecting a local map, when the determined positioning method is the positioning based on the wireless communication infrastructure and the number of the visible satellites each having the CNo or the SNR is smaller than a reference number.

10. The method of claim 1, wherein the determining of the map switch indicator comprises determining the indicator for selecting the global map, when the determined positioning method is the positioning based on the wireless communication infrastructure and the number of the visible satellites each having the CNo or the SNR is equal to or greater than a reference number.

11. The method of claim 1, wherein the determining of the map switch indicator comprises determining the indicator for selecting the local map, when the determined positioning method is the positioning by the GNSS and the location information is consistent consecutively a predetermined number of times from past to present.

12. The method of claim 1, wherein the determining of the map switch indicator comprises determining the indicator for selecting the global map, when the determined positioning method is the positioning by the GNSS and the location information is not consistent consecutively a predetermined number of times from past to present.

13. The method of claim 1, wherein, when the determining positioning method is the composite positioning for positioning the mobile terminal by compositing the location information of the mobile terminal provided from the GNSS and the location information of the mobile terminal provided from the wireless communication infrastructure, the determining of the map switch indicator comprises determining the indicator for selecting the local map when the location information is consistent consecutively a predetermined number of times from past to present, and determining the indicator for selecting the global map when the location information is not consistent consecutively the predetermined number of times from past to present.

14. A mobile terminal comprising:
   a positioning method determining unit configured to determine a positioning method based on location information and measurement information used for calculating a location;
   a map switch indicator determining unit configured to determine a map switch indicator by using at least one of the determined positioning method, the location information, and the measurement information;
   a map selection unit configured to select a global map or a local map according to the determined map switch indicator; and
   a location indication unit configured to indicate a location of the mobile terminal on the selected map,
   wherein the location information includes location information of the mobile terminal provided currently or provided in the past from a global navigation satellite system (GNSS), the measurement information includes at least one of the number of transmitters of a wireless communication infrastructure capable of wirelessly communicating with the mobile terminal, the number of visible satellites of the GNSS, a carrier-to-noise ratio (CNo) or a signal-to-noise ration (SNS of the respective ONSS visible satellites, and a dilution of precision (DoP) of the location information, and the positioning method is any one of positioning by the GNSS, positioning based on the wireless communication infrastructure, and composite positioning for positioning by using composited information of the location information for the mobile terminal provided from the GNSS and the location information for the mobile terminal provided from the wireless communication infrastructure,
   wherein, when there are transmitters in the wireless communication infrastructure, there are visible satellites, and the sum of the number of the transmitters of the wireless communication infrastructure and the number of the visible satellites is equal to or greater than a reference number, the positioning method determining unit determines positioning by compositing measurement information provided from the GNSS and measurement information provided from the wireless communication infrastructure as the positioning method, and
   wherein, when there are transmitters in the wireless communication infrastructure, there are visible satellites, and the sum of the number of the transmitters of the wireless communication infrastructure and the number of the visible satellites is smaller than the reference number, the positioning method determining unit determines positioning based on the wireless communication infrastructure as the positioning method,
   wherein the ma switch indicator is an internal value used to select the global map or the local map to indicate the location of the mobile terminal.

15. A method for providing a location service by a server, the method comprising:
   determining a positioning method based on location information of a mobile terminal and measurement information used for calculating a location of the mobile terminal;
   determining a map switch indicator by using at least one of the determined positioning method, the location information, and the measurement information; and
   transmitting the location information and the determined map switch indicator,
   wherein the location information includes location information of the mobile terminal provided currently or provided in the past from a global navigation satellite system (GNSS), the measurement information includes at least one of the number of transmitters of a wireless communication infrastructure capable of wirelessly communicating with the mobile terminal, the number of visible satellites of the GNSS, a carrier-to-noise ratio (CNo) or a signal-to-noise ratio (SNR) of the respective GNSS visible satellites, and a dilution of precision (DoP) of the location information, and the positioning method is any one of positioning by the GNSS, positioning based on the wireless communication infrastructure, and composite positioning for positioning by using composited information of the location information for the mobile terminal provided from the GNSS and the location information for the mobile terminal provided from the wireless communication infrastructure,
   wherein, in determining the positioning method, when there are transmitters in the wireless communication infrastructure, there are visible satellites, and the sum of the number of the transmitters of the wireless communication infrastructure and the number of the visible satellites is equal to or greater than a reference number, positioning by comprising measurement information provided from the GNSS and measurement information provided from the wireless communication infrastructure is determined as the positioning method, and
   wherein, in determining the positioning method, when there are transmitters in the wireless communication infrastructure, there are visible satellites, and the sum of the number of the transmitters of the wireless communication infrastructure and the number of the visible satellites is smaller than the reference number, positioning based on the wireless communication infrastructure is determined as the positioning method,
   wherein the map switch indicator is an internal value used to select a global map or a local map to indicate the location of the mobile terminal.

* * * * *